United States Patent
Durrer et al.

(10) Patent No.: US 10,088,373 B2
(45) Date of Patent: Oct. 2, 2018

(54) HEAT FLOW SENSOR

(71) Applicant: greenTEG AG, Zurich (CH)

(72) Inventors: Lukas Durrer, Ebnat-Kappel (CH);
Thomas Helbling, Frauenfeld (CH);
Etienne Schwyter, Zurich (CH); Wulf Glatz, Zurich (CH); Peter Stein, Zurich (CH)

(73) Assignee: GreenTEG AG (CH)

( * ) Notice: Subject to any disclaimer, the term of this patent is extended or adjusted under 35 U.S.C. 154(b) by 242 days.

(21) Appl. No.: 14/650,165

(22) PCT Filed: Dec. 23, 2013

(86) PCT No.: PCT/EP2013/077912
§ 371 (c)(1),
(2) Date: Jun. 5, 2015

(87) PCT Pub. No.: WO2014/102242
PCT Pub. Date: Jul. 3, 2014

(65) Prior Publication Data
US 2015/0308906 A1 Oct. 29, 2015

(30) Foreign Application Priority Data
Dec. 28, 2012 (CH) ........................... 2992/12

(51) Int. Cl.
G01K 17/20 (2006.01)
(52) U.S. Cl.
CPC ................................... G01K 17/20 (2013.01)

(58) Field of Classification Search
CPC .... G01K 7/20; G01K 7/02; G01K 7/00; G01J 5/10
See application file for complete search history.

(56) References Cited

U.S. PATENT DOCUMENTS

| | | | | |
|---|---|---|---|---|
| 3,525,648 A | * | 8/1970 | Poppendiek | G01K 17/00 136/226 |
| 3,607,445 A | | 9/1971 | Hines et al. | |
| 4,197,738 A | * | 4/1980 | Degenne | G01J 5/12 136/225 |
| 5,168,339 A | * | 12/1992 | Yokotani | H01L 35/12 136/203 |

(Continued)

OTHER PUBLICATIONS

Ph. Herin and P Thery, "Measurements on the Thermoelectric Properties of Thin Layers of Two Metals in Electrical Contact. Application for Designing New Heat-Flow Sensors", Meas. Sci. Technol., 3, 1992, pp. 495-500.

(Continued)

*Primary Examiner* — Lisa Caputo
*Assistant Examiner* — Nathaniel T Woodward
(74) *Attorney, Agent, or Firm* — Blank Rome LLP

(57) ABSTRACT

A heat flow sensor (HFS) and use thereof, which heat flow sensor should have the lowest possible invasiveness and nevertheless is robust enough to satisfy the requirements of individual applications. For this purpose, the heat flow sensor includes an active sensor element, which is provided with a highly thermally conductive heat-conducting element (8, 9) on the cold side and on the hot side, wherein the sensor element is covered or encased by an extremely thin, electrically strongly insulating, chemically inert, and strongly adhering protective layer (6).

18 Claims, 4 Drawing Sheets

(56) References Cited

U.S. PATENT DOCUMENTS

Figure 1A:
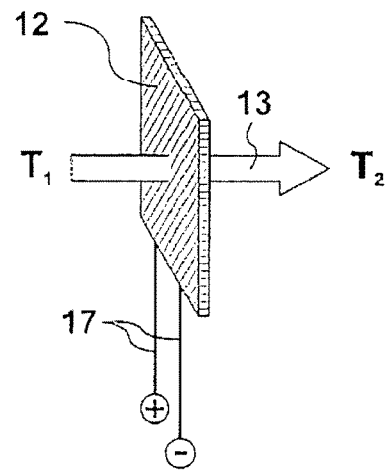

| | | | | |
|---|---|---|---|---|
| 5,515,238 | A * | 5/1996 | Fritz | H01L 35/32 |
| | | | | 136/203 |
| 6,278,051 | B1 | 8/2001 | Peabody | |
| 6,639,242 | B1 * | 10/2003 | Chen | H01L 23/38 |
| | | | | 257/12 |
| 2005/0105582 | A1 * | 5/2005 | Thery | G01J 5/12 |
| | | | | 374/29 |
| 2006/0137361 | A1 * | 6/2006 | Ghoshal | F25B 21/02 |
| | | | | 62/3.7 |
| 2006/0289051 | A1 * | 12/2006 | Niimi | H01L 35/32 |
| | | | | 136/203 |
| 2010/0257871 | A1 * | 10/2010 | Venkatasubramanian | |
| | | | | H01L 23/38 |
| | | | | 62/3.7 |
| 2011/0209740 | A1 * | 9/2011 | Bell | H01L 35/30 |
| | | | | 136/224 |
| 2012/0250723 | A1 * | 10/2012 | Blumm | G01N 25/4813 |
| | | | | 374/13 |
| 2013/0199593 | A1 * | 8/2013 | Higashida | H01L 35/08 |
| | | | | 136/230 |
| 2014/0287549 | A1 * | 9/2014 | Koehne | H01L 35/34 |
| | | | | 438/54 |
| 2015/0179912 | A1 * | 6/2015 | Maeshima | H01L 35/16 |
| | | | | 136/211 |

OTHER PUBLICATIONS

F. Van Der Graaf, "Heat Flux Sensors", TNO Institute of Applied Physics, Delft, The Netherlands, Sensors, 1990, pp. 297-322.

* cited by examiner

HEAT FLOW SENSOR

RELATED APPLICATION

The present application is a National Phase of PCT Patent Application PCT/EP2013/077912 filed Dec. 23, 2013, which claims priority to Switzerland Patent Application No. 02992/12 filed Dec. 28, 2012. The entire disclosures of those applications are hereby incorporated by reference.

The present invention relates to a heat flow sensor (HFS) and its use.

Heat flow sensors measure the thermal energy that flows per unit time from a hotter to a colder side (heat output, heat flow). In application the flat HFS is mounted on the object of interest, or is integrated into the latter. Examples of integration and application can be found e.g. in VAN DER GRAAF. The heat flow is measured by generating a voltage that is dependent on the magnitude of the heat flow flowing through the surface of the sensor. HFS are of known art and are already deployed industrially, e.g. under the designations of Hukseflow, Sequoia, Captec, and others).

Heat flow sensors are used in, amongst other applications, building technology to measure the quality of the thermal insulation of walls, or in calorimetry for measuring chemical reaction energies, or for measuring the energy of electromagnetic radiation.

Heat flow sensors in accordance with the prior art can be divided into three different categories. In heat flow sensors (thickness at the thinnest point is >1 mm), in miniaturised heat flow sensors that are manufactured using complementary metal oxide semiconductor (CMOS) technology, and in thin heat flow sensors with a total thickness that is <1 mm. By virtue of their construction and their protective encasement, thick heat flow sensors (>1 mm) with an assumed thermal conductivity of 0.4 W/m/K have a very high surface normalised thermal resistance of 30 cm^2*K/W up to several 100 cm^2*K/W. Since this thermal resistance affects, that is to say, reduces, the thermal flow that is to be measured, the measured result for the actual thermal flow present is distorted (invasiveness).

On account of their low thicknesses and correspondingly lower invasiveness thin heat flow sensors distort the measured result less than thick heat flow sensors. Thin heat flow sensors have, however, the disadvantage of so-called micro effects [see VAN DER GRAAF, page 312 ff, section 8.2.5]. This disadvantage can be counteracted by means of a thermally good conducting homogenising layer on the hot and cold sides of the sensor.

US2005/0105582 A1 shows a construction of thin heat flow sensors, which operate on the basis of a lateral distortion of the heat flow. In this sensor the thermoelectrically active material as conditioned by the manufacturing process is mounted on thin polyimide films. The polyimide films form a closed surface at right angles to the heat flow. Since polymer films (e.g. polyimide) are more likely to have low thermal conductivities (~0.2-0.6 W/m/K) compared with metals or ceramics, these films represent a non-negligible thermal resistance with respect to the total thermal resistance of the sensor.

The construction of the sensor described in US2005/0105582 A1 is also shown in [Ph Herin and P Thery, Meas. Sci. Technol. 3 (1992) 495-500]. Accordingly the sensors made by Captec are packaged above and below with a polymer film. This polymer film offers protection from external influences and from electrical breakdowns. On this film is mounted a heat-conducting element made from a Cu-foil. Such heat-conducting elements are important for purposes of homogenising the thermal flow so as to suppress the micro effects.

Another approach to thin heat flow sensors is described in U.S. Pat. No. 3,607,445. Thin thermal pairs are mounted onto a polymer film, and are folded and packaged such that a temperature difference across the thin polymer film leads to a different temperature for the thermal pairs, and by this means an electrical voltage is induced by means of the thermoelectric effect. This sensor is covered with a thin polymer film against the hot and cold sides. This total of three layers of a thin polymer film leads to a high thermal invasiveness of the sensor, even if the sensor is very thin.

The object underlying the invention is therefore that of developing a heat flow sensor (HFS) that has a lowest possible thermal invasiveness and nevertheless is robust enough to satisfy the requirements of individual applications.

This object is achieved with the features of claim 1. A configuration is proposed for the HFS, whose particular packaged construction has only a small thermal resistance, and nevertheless still offers sufficient protection from electrical, thermal and chemical effects.

This is enabled in that the active sensor element is covered with an extremely thin, electrically strongly insulating, chemically inert and strongly adhering protective layer. A highly conductive heat-conducting element, preferably an extremely thin adhesive, is stuck onto this protective layer on the flat sides of the sensor at right angles to the heat flow.

The protective layer is preferably configured in the form of a conformal coating, which adapts to the surface structure of the heat flow sensor.

Since the thermal resistance reduces linearly with the reduction of the layer thickness of a material, this construction enables a reduction of the invasiveness of the heat flow sensor.

For a further reduction of the invasiveness it is advantageous to affix the sensor-active p-type and n-type materials not between two films, but in through-contacted holes of a film (matrix). Thermoelectrically active p-doped and n-doped materials can also be designated as thermal columns. These are electrically connected with one another on the flat upper and lower sides of the matrix in series or in parallel by means of electrical conducting tracks (circuit elements).

The thermal columns can be filled or hollow. In the case of a hollow column the internal surface facing towards the hollow cavity can be covered with an extremely thin protective layer, or the hollow cavity can be completely filled with this protective layer. In order to reduce the invasiveness further the hollow cavity can be filled with a thermally conducting, but electrically insulating, material such as, for example, a thermally conductive adhesive.

Thermoelectrically active materials that can be used in the sensor are, for example, Ni, Cu, constantan, $Bi_2Te_3$, and/or other thermoelectric materials.

The materials thus arranged parallel to the heat flow ensure as a result of their thermal conductivity, which is better by a factor 5 to 10,000 times in comparison to polymers, an increased heat flow from the cold to the hot side of the sensor, and by this means reduce the invasiveness of the sensor, in addition to the optimised packaging.

In this arrangement it is advantageous if the outer surface of the thermal columns is not surrounded by thermally poorly conducting media such as air or a vacuum, but instead are anchored in a thermally better conducting material such as polymers. Polymers have a 10 to 20 times higher thermal conductivity than air. As a result the thermal energy flows not only through the thermal columns, but a large part also flows through the polymer. This arrangement has an additional positive effect on the reduction of the invasiveness.

Further advantageous configurations are disclosed in the dependent claims. The electrically insulating and chemically inert protective layer should have a thickness that is sufficient to satisfy the product requirements, but on the other hand is as thin and homogeneous as possible in order that the thermal conductivity of the total sensor may be increased. Requirements on the electrical insulation resistance (dielectric strength) and the chemical resistance of the protective layer of the HFS relate to ageing tests and protective tests that are typical for the industry, which the layer must withstand, such as thermal cycling tests, HAST tests (highly accelerated stress tests), or tests to withstand electrostatic breakdown and water ingress. Depending upon the material, this protective layer is between 0.1 µm and 20 µm, preferably between 0.1 and 10 µm, and particularly preferably between 0.1 and 7 µm. Advantageous materials are protective varnishes, such as acrylic varnish or epoxy resins, which can be applied by means of dip coating, spin coating, or spray coating. Ceramics, in particular $Al_2O_3$, which are applied by means of sputtering, evaporation of aluminium, and subsequent anodisation, or by means of "atomic layer deposition", can also be used for this purpose. Evaporation of coatings of very stable organic molecules, such as parylene, represents further options for the construction of a good protective layer.

Demanding requirements are also placed on the adhesive layer. This adhesive layer must be chosen to be sufficiently thick that all unevennesses on the surface of the active sensor element are evened out, and the adhesion must be sufficiently strong such that the layer cannot be delaminated. At the same time it must be thin enough such that the thermal resistance remains as low as possible. The thickness of this adhesive layer should be between 1 µm and 100 µm, preferably between 5 µm and 30 µm.

In what follows the invention is described in more detail with the aid of the figures. In the figures:

FIG. 1 shows the functional principle of an HFS, together with typical examples of applications (a-c), FIG. 2 shows the construction of an HFS packaging in accordance with the prior art (a-b), FIG. 3 shows an inventive construction of an HFS (a-d).

Figure 1B:
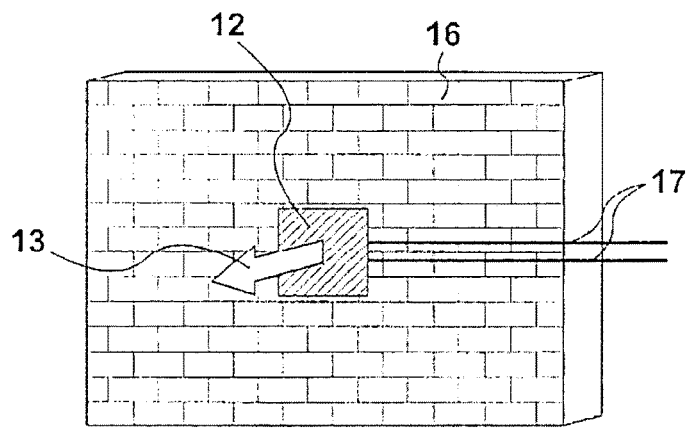
Figure 1C:
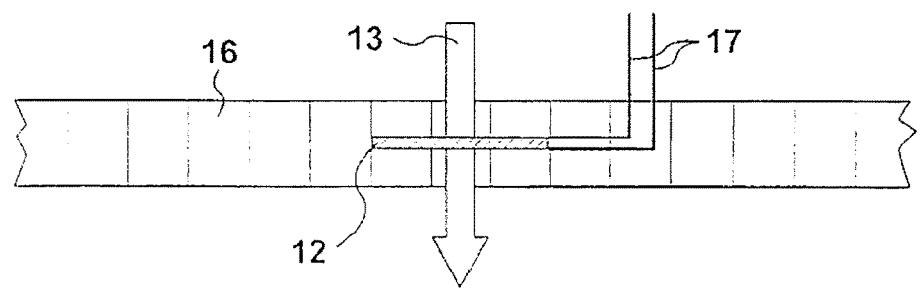
Figure 2A:
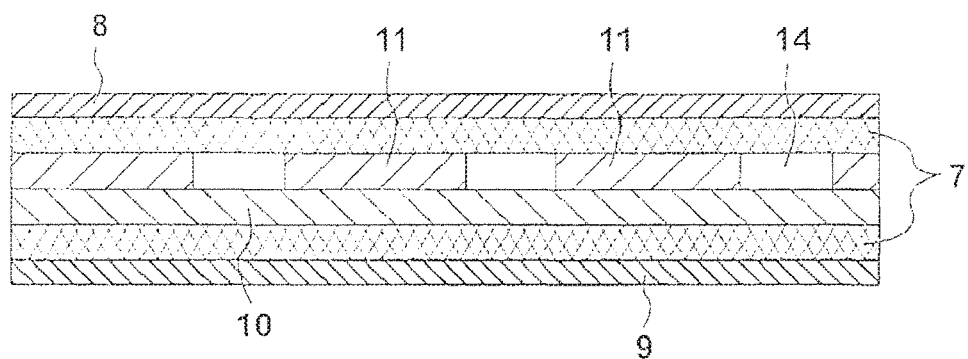
Figure 2B:
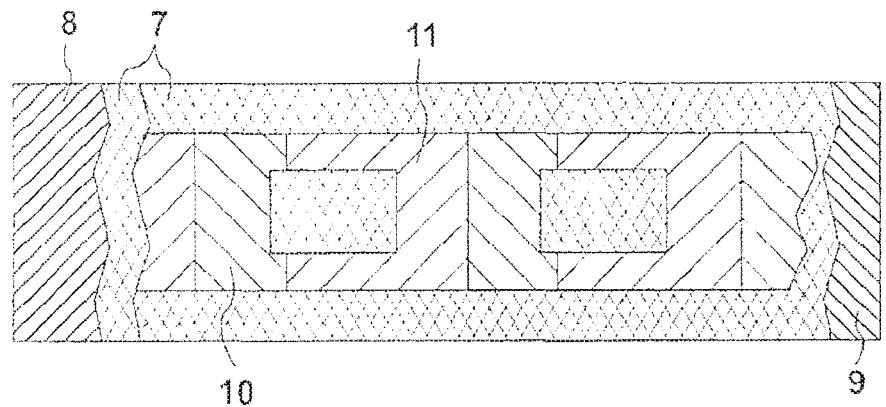

A schematic representation of an HFS is shown in FIG. 1a. A heat flow 13 passes through the heat flow sensor 12. The heat flow 13 flows from the hot side with a temperature T1 to the cold side with a temperature T2. The electrical voltage induced in the HFS 12 by the heat flow 13 is measured on the electrically conductive cable 17. The use of such a sensor is represented in FIG. 1b and FIG. 1c. In FIG. 1b the HFS is mounted on an object to be measured (e.g. a wall). The heat flow 13 flowing through the wall, which also passes through the HFS 12, is measured on the electrically conductive wires 17 with a voltage measurement unit (voltmeter) in terms of the electrical voltage impressed on the HFS. In FIG. 1c the HFS 12 is installed into an object to be measured (e.g. a wall) 16 and is surrounded by the object to be measured. The heat flow 13 flowing through the wall, which also passes through the HFS 12, is measured on the electrically conductive wires 17 with a voltage measurement unit (voltmeter) in terms of the electrical voltage impressed on the HFS. An HFS as embodied in accordance with the prior art as described in the introduction can be seen in FIG. 2. FIG. 2a shows a cross-section through a heat flow sensor consisting of constantan 10 and copper 11, which is provided with a protective layer of a thermally invasive polymer film, usually a polyimide (Kapton) 7, and a typical heat-conducting element (a heat conductive plate) on the cold side 8 and the hot side 9. FIG. 2b shows a top view. The sensor is not covered with an extremely thin, electrically insulating and chemically inert protective layer.

Figure 3A:
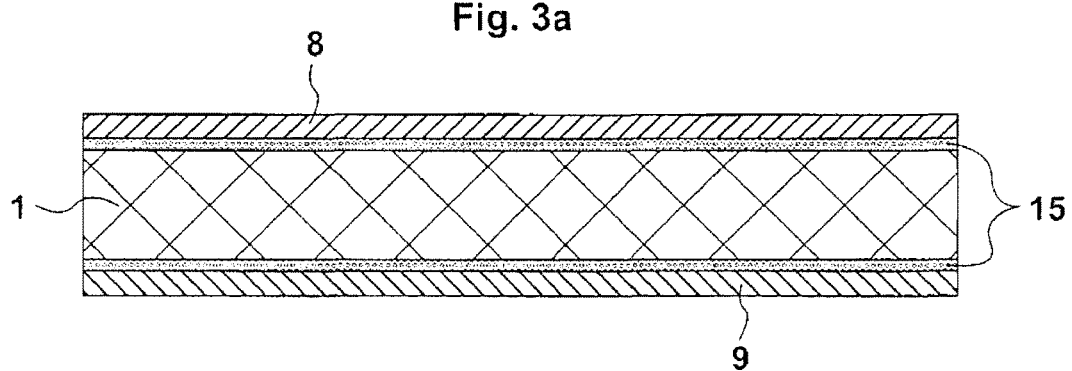

In contrast, the form of embodiment in FIG. 3a shows the inventive packaging construction of an only slightly invasive HFS. The flat sides of the sensor element 1 of the heat flow sensor are covered with an extremely thin protective layer, and are connected with the heat-conducting elements 8, 9 using a thermally conductive adhesive 15.

Advantageous materials for the extremely thin protective layer are protective varnishes, such as acrylic varnish, epoxy resins, or Si-based adhesives, which can be applied by means of dip coating, spin coating, or spray coating onto the flat sides of the heat flow sensor 1. Ceramics, in particular $Al_2O_3$, which are applied by means of sputtering, evaporation of Al, and subsequent anodisation, or by means of "atomic layer deposition" onto the flat sides of the sensor element 1, are also suitable materials. Coatings, which can be applied by the evaporation of very stable organic molecules such as parylene, are a further option for a good protective layer 6. The protective layer 6 can also consist of a thermally conducting acrylic varnish, epoxy resin, or an Si-based adhesive.

The protective layer 6 should preferably be less than µm, preferably less than 10 µm, and particularly preferably less than 7 µm.

The heat-conducting element 8, 9 can consist of Cu, Au, Pd, Al, Sb, steel, or another metal, or can also be formed from a ceramic or graphite, or a combination of these materials.

Figure 3B:
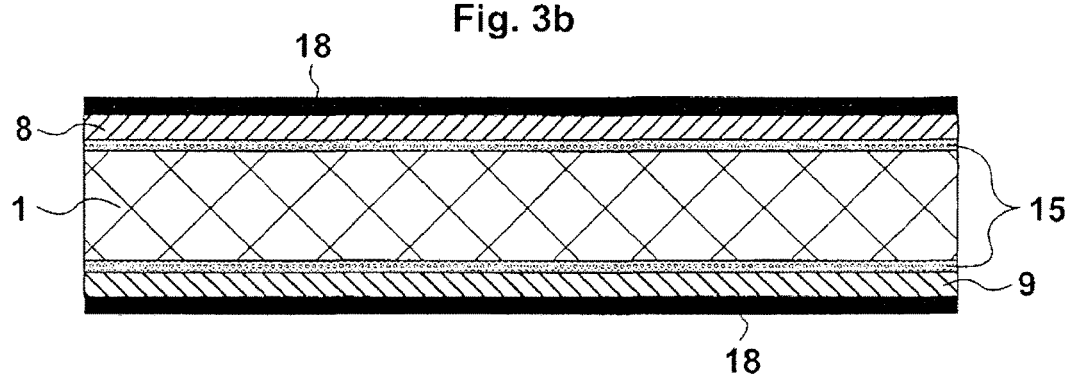

As represented in the form of embodiment of FIG. 3b, the heat-conducting element 8, 9 can be covered with a functional layer (layer 18). This functionality can, for example, be a layer that strongly absorbs electromagnetic radiation in the wavelength range from 0.2 µm to 10.6 µm, or a layer provided with biomolecules or biocells, e.g. with antibodies.

The heat-conducting element 8, 9 can be embodied such that it projects beyond the dimensions of the sensor element 1, and has a high thermal capacity.

The heat-conducting element 8, 9 can furthermore be embodied such that it is subdivided into flat segments. The total heat flow is thus divided into these segments. This is advantageous for the local resolution of the heat flow in the case of applications with non-homogeneous flows.

The adhesive layer 15, which attaches the heat-conducting elements 8, 9 onto the upper and lower sides of the sensor element 1, consists of an adhesive, and has a thickness of less than 100 µm, preferably of less than 30 µm, and particularly preferably of less than 20 µm. This adhesive layer 15 preferably consists of an adhesive based on an epoxy, acrylic, silicon, PMMA, PDMS, etc. and can also consist of the same material as the extremely thin protective layer. The adhesive layer can be applied either onto the heat-conducting elements 8, 9 and/or onto the surfaces of the sensor element 1, by means of, for example, spray coating, dip coating, lamination coating methods, etc.

Figure 3C:
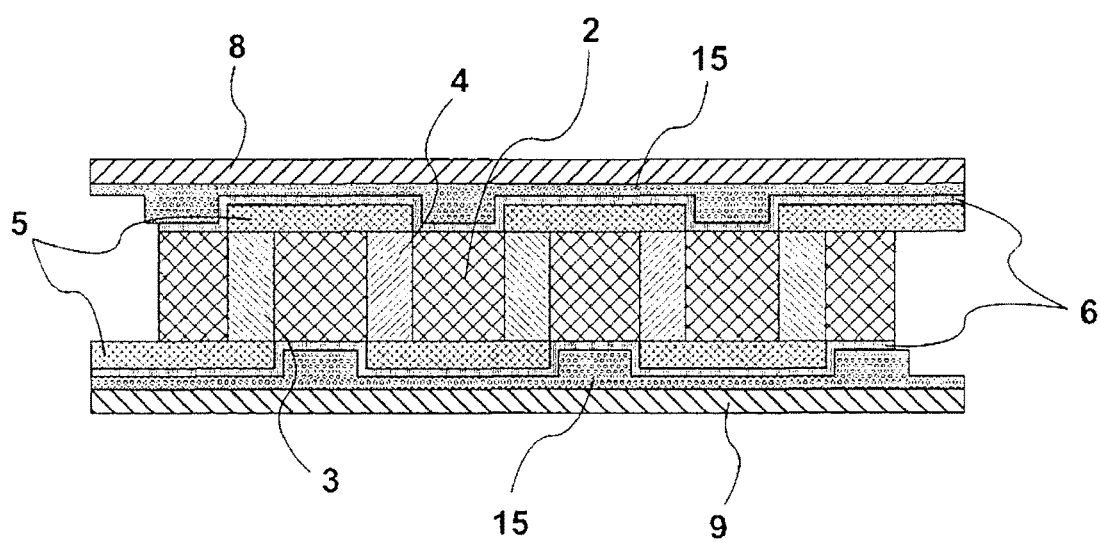

FIG. 3c shows a form of embodiment in which the thermoelectric material of n-type 3 and the thermoelectric material of p-type 4, in the form of thermal columns through a polymer film, is led through a matrix 2, or is embedded into the matrix 2, wherein the end faces of the thermal columns 3, 4 facing the cold and hot sides are not surrounded by the matrix 2.

The other elements of a heat flow sensor are arranged between two thermal boundary surfaces. The thermoelectric materials of n-type 3 or p-type 4 are located in the matrix 2, a cladding material, in the form of columns aligned parallel to one another and orthogonal to the boundary surfaces (thermal columns). In most cases (series circuit), the thermal columns 3, 4 are arranged, or rather embedded, in an alternating sequence (of alternate p- and n-columns) in a matrix 2. Each thermal column 3, 4 is both an electrical and also a thermal connection between the two thermal boundary surfaces. On their end faces, i.e. the sides that are facing the thermal boundary surfaces, these thermal columns 3, 4 are electrically connected together either in series or in parallel by means of electrical circuit connections 5, depending upon the requirements of the application. In the case of a series circuit the circuit connection 5 in each case connects a column 3 to a column 4 that is always offset by one position.

The matrix 2 can consist of a plastic, e.g. PI, PET, PES, PEEK, or also of glass, Si, $SiO_2$, PCB materials, or others.

Here the thermoelectrically active materials can consist of Cu, Ni, constantan (an alloy of Cu and Ni), or other thermoelectrically active materials such as $Bi_2Te_3$, SbTe, SbBiTe, Se, Bi, Te, Cu, Ni, SbBi, ZnBi, ZnTe, ZnSb, or others.

Figure 3D:
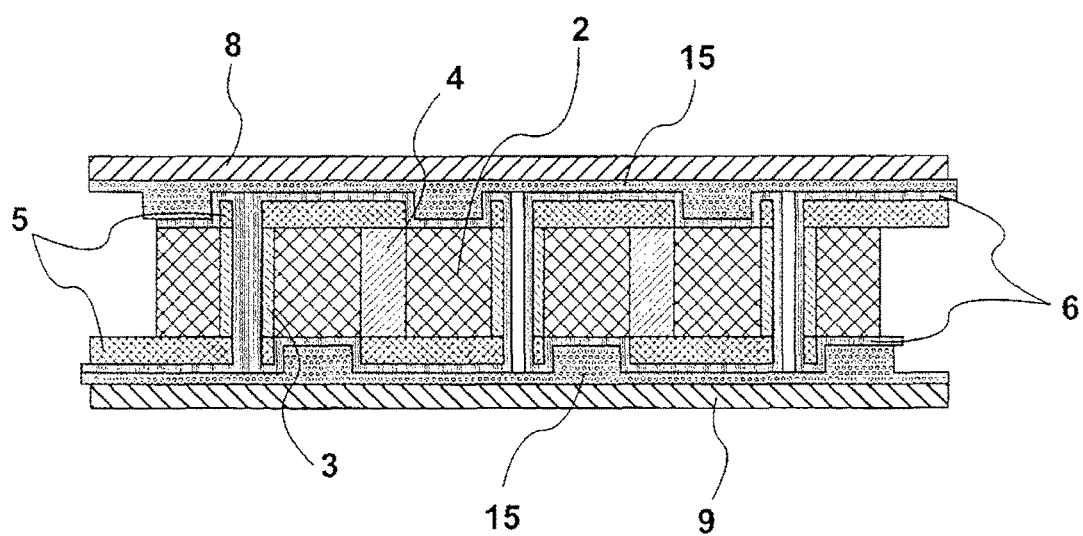

FIG. 3d shows a form of embodiment, in which at least one thermal column 3, 4 is hollow. In the case of a hollow column there are forms of embodiment in which the internal surface facing towards the hollow cavity is covered with an extremely thin protective layer 6, or in which the hollow cavity is completely filled with this protective layer. In order to reduce the invasiveness further the hollow cavity can be filled with a thermally conducting but electrically insulating material such as, for example, a thermally conductive adhesive.

REFERENCE SYMBOL LIST

1 Sensor element
2 Matrix
3 n-type semiconductor
4 p-type semiconductor
5 Circuit connection
6 Electrical insulation
7 Polyimide (Kapton)
8 Heat-conducting element: cold side
9 Heat-conducting element: hot side
10 Constantan
11 Copper
12 Heat flow sensor
13 Heat flow [W]
14 Air
15 Thermally conductive adhesive
16 Object to be measured (wall)
17 Sensor cable
18 Functional layer
T1 Temperature of the hot side
T2 Temperature of the cold side

The invention claimed is:

1. A heat flow sensor, comprising an active sensor element, which comprises thermoelectric materials of the n-type (3) and the p-type (4) in the form of columns forming thermopiles (3, 4), wherein the columns are orientated in parallel with one another and normal to end faces of the active sensor element, wherein the columns of thermopiles (3, 4) are embedded in a matrix (2) as a cladding material and the thermopiles (3, 4) are electrically connected on end faces of the thermopile on a cold side and on a hot side by means of electrical connections (5) and the end faces of the active sensor element is provided on the cold side and on the hot side with a thermally conductive heat-conducting element wherein the active sensor element (1) is coated or clad with a thin, from 0.1 μm to 20 μm thick, electrically insulating, chemically inert and adhesive protective layer (6), wherein the sections of the matrix (2) facing the heat-conducting elements (8, 9) and the connections (5) are covered by the adhesive protection layer and the active sensor element (1) thus has a reduced thermal invasiveness or reduced thermal resistance.

2. The heat flow sensor in accordance with claim 1, wherein the heat-conducting elements (8, 9) are adhesively bonded by means of an adhesive (15) on the protective layer (6) of the sensor element (1) at right angles to the heat flow (13).

3. The heat flow sensor in accordance with claim 2, wherein the adhesive (15) is made of the same material as the thin protective layer.

4. The heat flow sensor in accordance with claim 2, wherein the thickness of the adhesive protective layer amounts to 1 μm to 100 μm.

5. The heat flow sensor in accordance with claim 2, wherein the thickness of the adhesive protective layer amounts to 5 μm to 30 μm.

6. The heat flow sensor n accordance with claim 1, wherein the matrix (2) is a foil.

7. The heat flow sensor in accordance with claim 1, wherein at least one thermopile is internally hollow.

8. The heat flow sensor in accordance with claim 7, wherein the inner wall of the hollow thermopiles are coated with the thin protective layer with a thickness between 0.1 μm and 20 μm, or are completely filled with the material of the protective layer or another electrically insulating material.

9. The heat flow sensor in accordance with claim 1, wherein the thickness of the protective layer (6) amounts to 0.1 to 10 μm.

10. The heat flow sensor in accordance with claim 1, wherein the protective layer (6) is formed from a protective lacquer, an epoxide, a silicone, or ceramic.

11. The heat flow sensor in accordance with claim 1, wherein the heat-conducting element (8, 9) is made of Cu, Au, Pd, Al, Sb, steel or another metal or is formed from ceramic or graphite or is a combination of these materials.

12. The heat flow sensor in accordance with claim 1, wherein the heat-conducting element is coated with a functional layer (18), which absorbs electromagnetic radiation in the wavelength range from 0.1 μm to 10.6 μm.

13. The heat flow sensor in accordance with claim 12, in which the functional layer (18) is made of antibodies.

14. The heat flow sensor in accordance with claim 13, wherein the functional layer (18) strongly absorbs electromagnetic radiation in the wavelength range from 0.1 μm to 0.4 μm.

15. The heat flow sensor in accordance with claim 1, wherein the heat-conducting element is coated with a functional layer (18), which is made of biomolecules or biocells.

16. The heat flow sensor in accordance with claim 1, wherein the heat-conducting element (8, 9) is configured such that it projects beyond the dimensions of the sensor element (1).

17. The heat flow sensor in accordance with claim 1, wherein the heat-conducting element (8, 9) is divided into surface segments.

18. The heat flow sensor in accordance with claim 1, wherein the thickness of the protective layer (6) is 0.1 μm to 7 μm.

\* \* \* \* \*